(12) United States Patent
Beauford

(10) Patent No.: US 7,136,679 B2
(45) Date of Patent: Nov. 14, 2006

(54) CALL CATEGORY FOR A CALL THAT TERMINATES AT ANNOUNCEMENT SERVER COMPONENT

(75) Inventor: Kevin D. Beauford, Chicago, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 355 days.

(21) Appl. No.: 10/697,216

(22) Filed: Oct. 30, 2003

(65) Prior Publication Data

US 2005/0094796 A1    May 5, 2005

(51) Int. Cl.
*H04B 1/38* (2006.01)
*H04M 1/00* (2006.01)

(52) U.S. Cl. ............... 455/567; 455/407; 455/408; 455/417; 455/418; 379/114.03; 379/114.21; 379/252

(58) Field of Classification Search ........ 455/406–409, 455/415, 417–418, 433, 458, 567; 379/114.03, 379/114.21–114.23, 211.01, 252, 373.01–373.03
See application file for complete search history.

(56) References Cited

U.S. PATENT DOCUMENTS

| 5,432,845 | A | * | 7/1995 | Burd et al. | ............ 379/211.01 |
| 5,926,537 | A | * | 7/1999 | Birze | ......................... 379/252 |
| 2001/0028706 | A1 | * | 10/2001 | Nolting | ...................... 379/134 |
| 2004/0032946 | A1 | * | 2/2004 | Koser et al. | ........... 379/373.01 |
| 2004/0109558 | A1 | * | 6/2004 | Koch | .................... 379/373.01 |

* cited by examiner

*Primary Examiner*—Steve M. D'Agosta

(57) ABSTRACT

An apparatus in one example comprises a call control component that sets a call category for a call to indicate that the call terminates at an announcement server component prior to connection with a called communication device. Upon receipt of an answer message from the announcement server component, the call control component drops the answer message based on the call category.

13 Claims, 3 Drawing Sheets

CALL CATEGORY FOR A CALL THAT TERMINATES AT ANNOUNCEMENT SERVER COMPONENT

TECHNICAL FIELD

The invention relates generally to communications and more particularly to a call category for calls that terminate at an announcement server component.

BACKGROUND

A call to a called communication device in one example terminates at an announcement server component prior to connection with the called communication device. The announcement server component plays an announcement to a calling communication device of the call. The announcement server component in one example comprises a customized ringback tone component. The customized ringback tone component allows a user of the called communication device to preselect a ringback tone or announcement to be played to the calling communication device. When the calling communication device calls the called communication device, a user of the calling communication device normally hears a traditional ringing sound before the called communication device answers the call. The customized ringback tone component replaces the traditional ringing sound with the ringback tone or announcement preselected by the user of the called communication device. The ringback tone component allows the user of the called communication device to customize the ringing sound that the user of the calling communication device hears upon calling the called communication device.

When involved on the call to provide an announcement, some announcement server components send answer messages to a call control component that supports the call and controls billing for the call. Upon receipt of answer messages, the call control component initiates billing for the call. For example, based on International Telecommunication Union ("ITU-T") Q.764 and American National Standards Institute ("ANSI") T1.113 standards, billing shall begin upon reception of an answer message, for example, a signaling system 7 ("SS7") Answer message. However, billing should not occur during an announcement or ringback tone phase of the call. As one shortcoming, if the announcement server component sends an answer message to the call control component, then the call control component may initiate billing for the call based on the answer message from the announcement server component. As another shortcoming, initiation of billing based on the answer message from the announcement server component causes billing during the announcement or ringback tone phase of the call.

One communication system that serves to prevent billing during the announcement or ringback tone phase employs a recent change mechanism to drop the answer message from the announcement server component. For example, the communication system activates the recent change mechanism for specific carrier trunks connected to the announcement server component. The recent change mechanisms in one example are individually set by customer support on the carrier trunks connected to the announcement server component. As one shortcoming, if the recent change mechanisms are set incorrectly by customer support, then the carrier trunks may mistakenly drop answer messages from the called communication device which would prevent proper billing for the call. As another shortcoming, customer support must modify each carrier trunk connected to the announcement server component with recent change mechanisms to drop the answer messages from the announcement server component.

Thus, a need exists for an enhanced capability to prevent an initiation of billing for a call based on an answer message from an announcement server component.

SUMMARY

The invention in one implementation encompasses an apparatus. The apparatus comprises a call control component that sets a call category for a call to indicate that the call terminates at an announcement server component prior to connection with a called communication device. Upon receipt of an answer message from the announcement server component, the call control component drops the answer message based on the call category.

Another implementation of the invention encompasses a method. A call category is set for a call to indicate that the call terminates at an announcement server component prior to connection with a called communication device. An initiation of billing for the call upon receipt of an answer message from the announcement server component is prevented based on the call category.

Yet another implementation of the invention encompasses an article. The article comprises one or more computer-readable signal-bearing media. The article comprises means in the one or more media for setting a call category for a call to indicate that the call terminates at an announcement server component prior to connection with a called communication device. The article comprises means in the one or more media for preventing an initiation of billing for the call upon receipt of an answer message from the announcement server component based on the call category.

DESCRIPTION OF THE DRAWINGS

Features of exemplary implementations of the invention will become apparent from the description, the claims, and the accompanying drawings in which:

DETAILED DESCRIPTION

Figure 1:
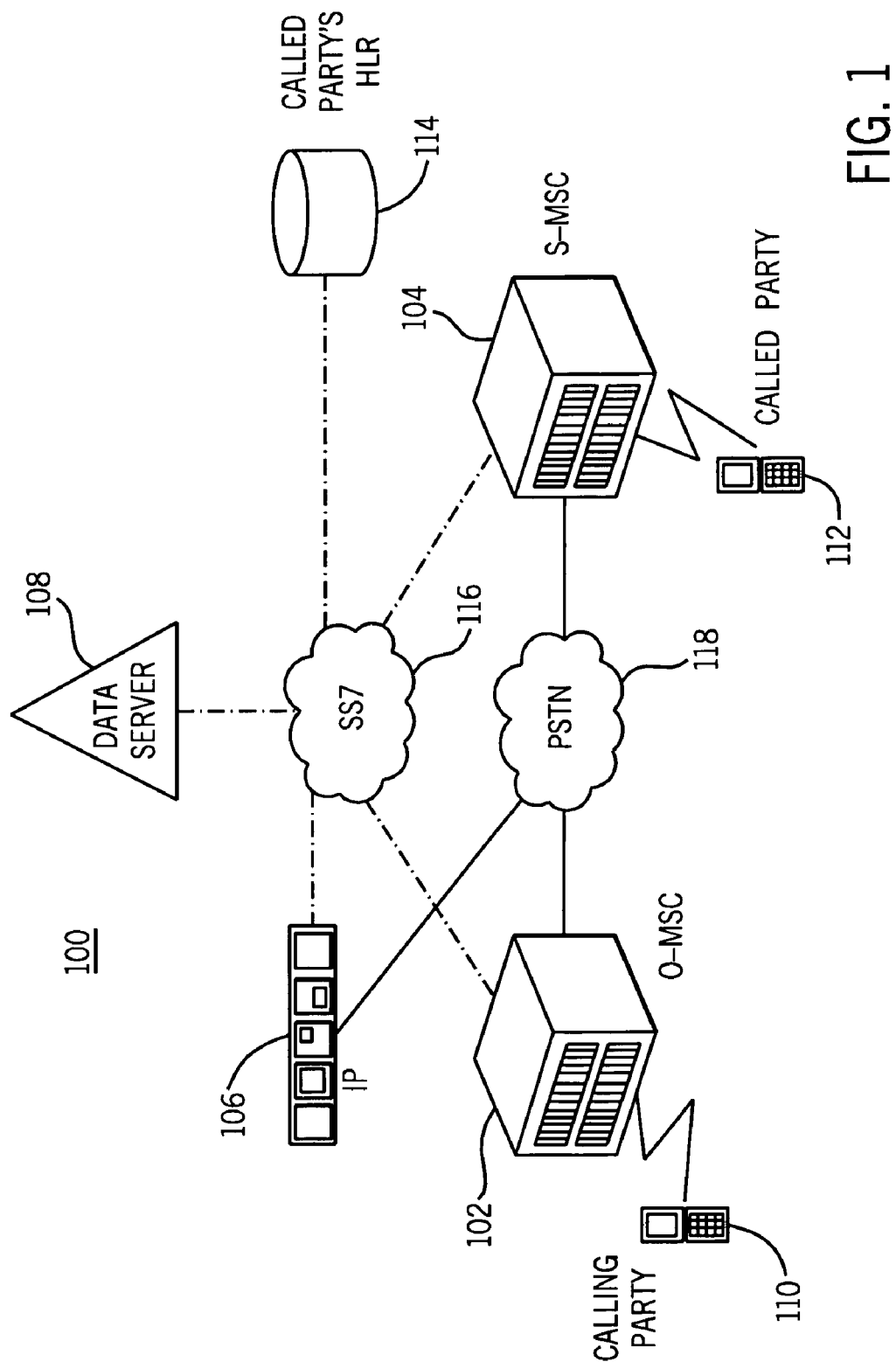
FIG. 1 is a representation of an exemplary implementation of an apparatus that comprises one or more call control components, one or more intelligent peripherals, one or more data servers, one or more calling communication devices, and one or more called communication devices.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more call control components (e.g., one or more mobile switching centers ("MSCs") 102 and 104), one or more intelligent peripherals ("IPs") 106, one or more data servers 108, one or more calling communication devices 110, and one or more called communication devices 112. The apparatus 100 in one example further comprises a home location register ("HLR") 114 and/or a visitor location register ("VLR") associated with the called communication device 112.

A signaling network 116 communicatively couples the MSCs 102 and 104, the IP 106, the data server 108, and the home location register 114. The signaling network 116 in one example comprises a signaling system 7 ("SS7") network that supports signaling traffic. A bearer network 118 communicatively couples the MSCs 102 and 104, the IP 106, and the data server 108. The bearer network 118 in one example comprises a public switched telephone network ("PSTN") that supports bearer traffic.

The MSCs 102 and 104 support mobile telecommunication devices, for example, the calling communication device 110 and the called communication device 112. The MSC 102 in one example comprises an originating mobile switching center ("O-MSC") 102 and the MSC 104 comprises a serving mobile switching center ("S-MSC") 104. For example, the O-MSC 102 supports call delivery for the called communication device 112 and the S-MSC 104 supports an air interface connection to the called communication device 112. In one example, the O-MSC 102 supports a home area of the called communication device 112 and the S-MSC 104 supports the called communication device 112 if the called communication device 112 moves to a roaming area. If the called communication device 112 is within the home area supported by the O-MSC 102, then the S-MSC 104 may not be in the call path between the calling communication device 110 and the called communication device 112. For example, in this case, the O-MSC 102 also serves as a serving MSC for the called communication device 112.

The MSCs 102 and 104 in one example initiate billing for a call that involves the calling communication device 110 and/or the called communication device 112. For example, one or more of the O-MSC 102 and the S-MSC 104 maintain a billing record for the calling communication device 110 and the called communication device 112. For example, the billing record comprises one or more automatic messaging account ("AMA") billing records. In one example, the O-MSC 102 may update an AMA billing record upon occurrence of a billable event associated with the calling communication device 110. In another example, the O-MSC 102 may update an AMA billing record upon occurrence of a billable event associated with the called communication device 112. To accept a call from the calling communication device 110, the called communication device 112 sends an answer message to the S-MSC 104. The S-MSC 104 in one example sends the answer message to the O-MSC 102. Upon receipt of the answer message, one or more of the O-MSC 102 and the S-MSC 104 initiates billing for the call. For example, the one or more of the O-MSC 102 and the S-MSC 104 update the AMA billing record for the call to indicate connection of the call and initiation of billing for the call.

The IP 106 and the data server 108 may be combined into a single intelligent network platform or divided into a plurality of intelligent network platforms. The IP 106 and the data server 108 serve to route calls, connect calls to communication devices, and provide feedback to be played to the calling communication device 110 during a call from the calling communication 110 device to the called communication device 112. For example, the IP 106 and the data server 108 serve to enable a ringback tone service. The IP 106 and the data server 108 allow a user of the called communication device 112 to preselect one or more portions of the feedback to be played at the calling communication device 110. The user of the called communication device 112 may customize the feedback. For example, the user may preselect a ringback tone to be played in the feedback at the calling communication device 110. The IP 106 in one example comprises an announcement server component. The IP 106 serves to play announcements or tones to the calling communication device 110.

The ringback tone service allows the user of the called communication device 112 to preselect feedback to be played to the calling communication device 110 upon occurrence of one or more events. In one example, the feedback comprises a preselected ringback tone. When the calling communication device 110 calls the called communication device 112, a user of the calling communication device 110 normally hears a traditional ringing sound before the called communication device 112 answers the call. However, the IP 106 and the data server 108 serve to replace the traditional ringing sound with the ringback tone or announcement preselected by the user of the called communication device 112. The IP 106 and the data server 108 allow the user of the called communication device 112 to customize the ringing sound that the calling communication device 110 hears upon calling the called communication device 112.

In another example, the feedback comprises a call progress indication. The IP 106 and the data server 108 allow the user of the called communication device 112 to customize the call progress indications that the calling communication device 110 hears upon occurrence of call progress events. For example, the IP 106 may play a customized announcement for the user of the calling communication device 110 in response to a busy signal, non-answer signal, or routing failure indication.

The data server 108 in one example comprises a service control point ("SCP"). The data server 108 in one example determines that one or more characteristics of the incoming call match one or more ringback tone service criteria set up by the user of the called communication device 112. Thus, the data server 106 routes the incoming call to the IP 106 to play the preselected ringback tone to the calling communication device 110. The user of the called communication device 112 may instruct the data server 108 to invoke the ringback tone service upon occurrence of an incoming call from a specific calling communication device, an incoming call at a specific time of day, an incoming call on a specific day of the week, an incoming call on any other special day of the year, or other call progress events.

In one example, the IP 106 sends an answer message to the O-MSC 102 for a call that employs the ringback tone service. If the O-MSC 102 was to process the answer message from the IP 106, then the O-MSC 102 would initiate billing for the call prior to completion of the an announcement or ringback tone phase of the call. However, billing should not occur during the announcement or ringback tone phase of the call. Thus, to prevent billing initiation for the call during the announcement or ringback tone phase of the call, the O-MSC 102 drops the answer message from the IP 106. In one example, the O-MSC 102 drops the answer message from the IP 106. In another example, the S-MSC 104 drops the answer message from the IP 106.

Carrier trunks (e.g., long distance carrier trunks) that deliver the answer message from the IP 106 to the O-MSC 102 may initiate billing for usage of the carrier trunks based on the answer message from the IP 106. However, the O-MSC 102 drops the answer message upon arrival at the O-MSC 102. For example, the O-MSC 102 determines to not update billing records (e.g., an AMA billing record) associated with the call. Dropping the answer message upon arrival at the O-MSC 102 rather than at or before arrival at the carrier trunks allows billing for use of the carrier trunks by the answer message from the IP 106.

During call setup for the incoming call to the called communication device 112, the O-MSC 102 queries the HLR 114 for service information associated with the called communication device 112. The O-MSC 102 in one example employs the service information to determine that the incoming call for the called communication device will be terminated at the IP 106 to play an announcement or ringback tone to the calling communication device 110. Therefore, the O-MSC 102 sets a call category for the call to indicate that the call terminates at the IP 106. The call category also indicates to the O-MSC 102 to drop the answer message upon receipt from the IP 106. Upon receipt of the answer message from the IP 106, the O-MSC 102 checks the call category for the call. If the call category indicates that the call terminated at the IP 106, then the O-MSC 102 drops the answer message to prevent an initiation of billing based on the answer message. The call category in one example comprises a calling party category. The O-MSC 102 sets the calling party category in a call setup message to indicate that the call terminates at the IP 106. For example, the O-MSC 102 sets the calling party category to a value that indicates that the call terminates at the IP 106 prior to connection with the called communication device 112. Thus, the IP 106 should drop the answer message from the IP 106.

Figure 2:
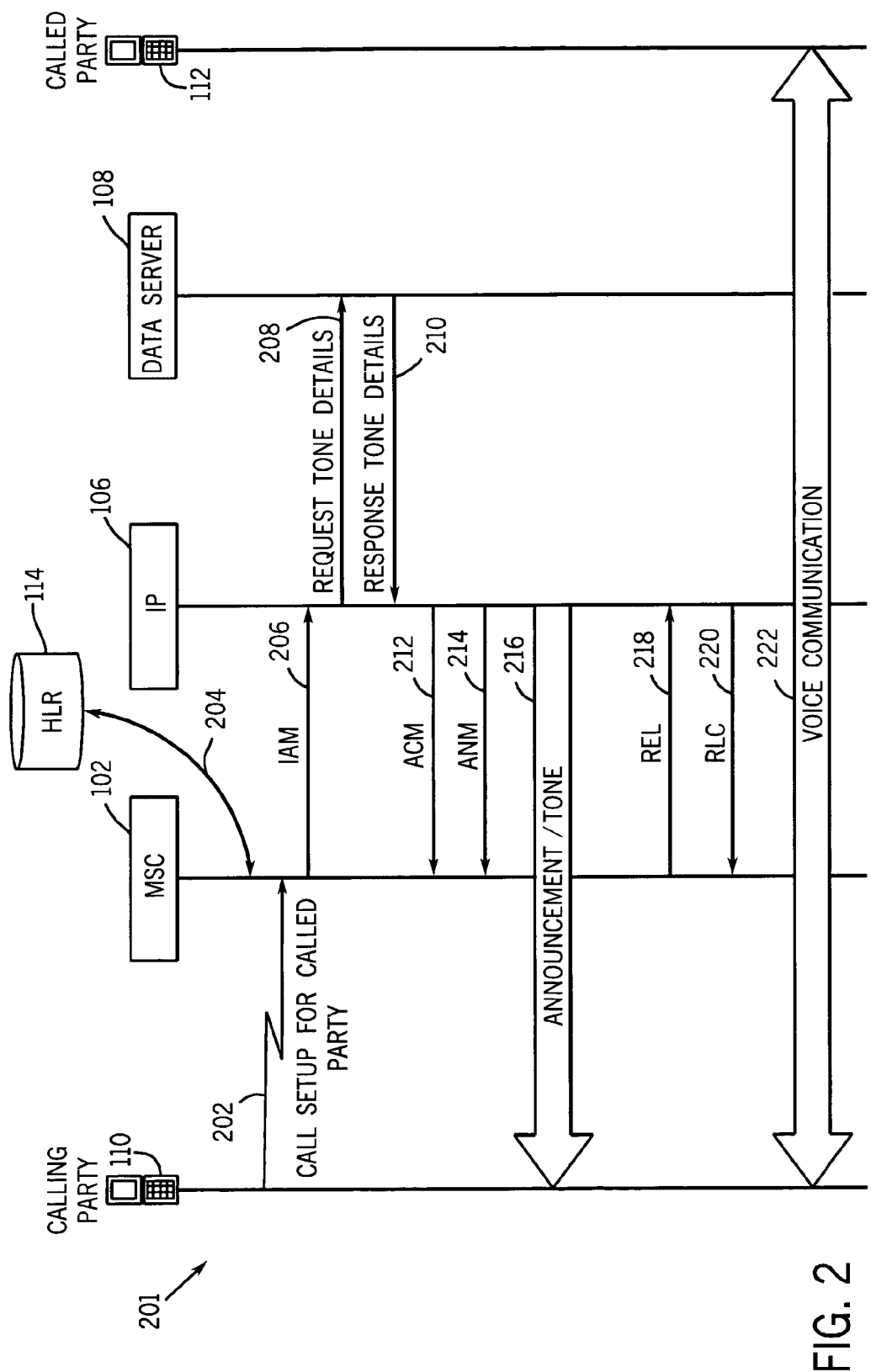
FIG. 2 is a representation of one exemplary message flow for employment of a call category to prevent an initiation of billing for the call based on an answer message from the intelligent peripheral of the apparatus of FIG. 1.

Turning to FIG. 2, an illustrative description of one exemplary operation of the apparatus 100 is now presented, for explanatory purposes. A message flow 201 represents an exemplary termination of a call at the announcement server component (e.g., the IP 106) for delivery of an announcement to the calling communication device 110. For example, the IP 106 plays an announcement or tone preselected by the user of the called communication device 112 to the calling communication device 110. The message flow 201 also represents an exemplary employment of a call category to prevent an initiation of billing for the call based on an answer message from the IP 106. The message flow 201 in one example illustrates a ringback tone service. The user of the called communication device 112 in one example has configured and activated the ringback tone service prior to the initiation of the message flow 201. For example, the user of the called communication device 112 has preselected one or more ringback tones for incoming calls that meet one or more criteria.

To initiate a call to the called communication device 112, the user of the calling communication device 110 dials the telephone number of the called communication device 112 resulting in a call setup message 202 being received at the O-MSC 102. The call setup message 202 indicates that the call is for the called communication device 112. Call processing logic in the O-MSC 102 encounters a Mobile_Termination trigger when processing the call to the called communication device 112. Upon encountering the Mobile_Termination trigger, the O-MSC 102 initiates a query 204 of the HLR 114. For example, the O-MSC 102 sends a location request invoke ("LOCREQ") message to the HLR 114 associated with the called communication device 112. The HLR 114 determines a location and service information for the called communication device 112 and sends a location request return result ("locreq") message to the O-MSC 102.

In one example, where the calling communication device 110 comprises a mobile phone, the HLR 114 has been provisioned to return appropriate triggers and address information to the O-MSC 106 based on the characteristics of the call. In another example, where the calling communication device 110 comprises a landline telephone, the Central Office switches that support the calling communication device 110 are provisioned to return triggers and address information to the O-MSC 106 based on the characteristics of the call. The O-MSC 102 queries the HLR 114 to determine the current location of the called communication device 112 and whether the call requires an announcement played to the calling communication device 110. If the call requires the announcement played to the calling communication device 110, then the O-MSC 102 terminates the call at the IP 106.

Upon determination that call meets one or more criteria to provide the announcement or tone to the calling communication device 110, the O-MSC 102 sets a call category to a value that indicates that the call terminates at the IP 106. Upon receipt of a subsequent answer message from the IP 106, the O-MSC 102 checks the call category to determine whether to process the answer message. For example, the O-MSC 102 determines whether to update billing records (e.g., AMA billing records) for the call based on the answer message.

To extend the call to the IP 106, the O-MSC 102 sends an initial address message ("IAM") 206 to the IP 106. The O-MSC 106 sets a calling party number parameter in the IAM 206 to the directory number (e.g., telephone number) of the calling communication device 110. The O-MSC 106 sets a RedirectingNumberDigits parameter in the IAM 206 to the directory number of the called communication device 112. Also, the O-MSC 106 sets a called party number parameter in the IAM 206 to a routing number employed to extend the call to the IP 106. For example, the O-MSC 106 sets the called party number parameter to a directory number of the IP 106 to identify that the call terminates at the IP 106.

The IP 106 processes the IAM 206 and sends a tone request message 208 to the data server 108. The IP 106 queries the data server 108 with information received from the IAM 206. The tone request message 208 requests the ringback tone or announcement that is to be played to the calling communication device 110 based on one or more characteristics of the call. The tone request message 208 in one example comprises a transfer control protocol/internet protocol ("TCP/IP") or lightweight directory access protocol ("LDAP") message.

In one example, the IP 106 and the data server 108 comprise separate platforms. In another example, the IP 106 and the data server 108 comprise portions of a single platform. For example, the functionality of both the IP 106 and the data server 108 may be combined into one or more intelligent network platforms. If the IP 106 and the data server 108 are combined into one intelligent network platform, then messages between the IP 106 and the data server 108 (e.g., the tone request message 208) become internal operations of the one intelligent network platform. For example, small applications may employ the one intelligent network platform for the functionality of both the IP 106 and the data server 108.

Upon receipt of the tone request message 208, the data server 108 sends a tone response message 210 to the IP 106. The tone response message 210 indicates a customized tone or announcement to be played by the IP 106 to the calling communication device 110. Upon receipt of the tone response message 210, the IP 106 sends an address completion message ("ACM") 212 to the O-MSC 106. The ACM 212 provides voice path cut-thru to the calling communication device 110.

In one example, the IP 106 sends an answer message ("ANM") 214 to the O-MSC 106. Upon receipt of the ANM 214, the O-MSC 106 checks the call category for the call to determine whether to process the ANM 214. Since the call terminated at the IP 106, the O-MSC 106 previously set the call category to indicate a requirement to drop the ANM 214 from the IP 106. For example, based on International Telecommunication Union ("ITU-T") Q.746 and American National Standards Institute ("ANSI") T1.113 standards, billing shall begin upon reception of an answer message, for example, a signaling system 7 ("SS7") Answer message. However, billing should not occur during an announcement or ringback tone phase of the call. Thus, to prevent an initiation of billing for the call based on the ANM 214, the O-MSC 106 drops the ANM 214. In one example, the IP 106 sends the ACM 212 followed by the ANM 214. In another example, the IP 106 sends the ANM 214 without transmission of the ACM 212.

The IP 106 plays the appropriate ringback tone or announcement 216 to the calling communication device 110 based on the one or more characteristics of the call. For example, the IP 106 connects the appropriate ringback tone or announcement 216 to the calling communication device 110 on a first leg of the call. The first leg of the call connects the calling communication device 110 with the IP 106. The O-MSC 106 sends a release ("REL") message 218 to the IP 106. In response to the REL message 218, the IP 106 sends a release complete ("RLC") message 220 to the O-MSC 106. The IP 106 initiates a second leg of the call to connect with the called communication device 112. The IP 106 in one example bridges the first call leg with the second call leg to connect the calling communication device 110 with the called communication device 112. To accept the call from the calling communication device 110, the called communication device 110 sends an answer message to the O-MSC 102 via the S-MSC 104. The O-MSC 102 accepts the answer message from the called communication device 110 and initiates billing for the call. Upon connection of the first call leg with the second call leg, voice communication 222 ensues.

Figure 3:
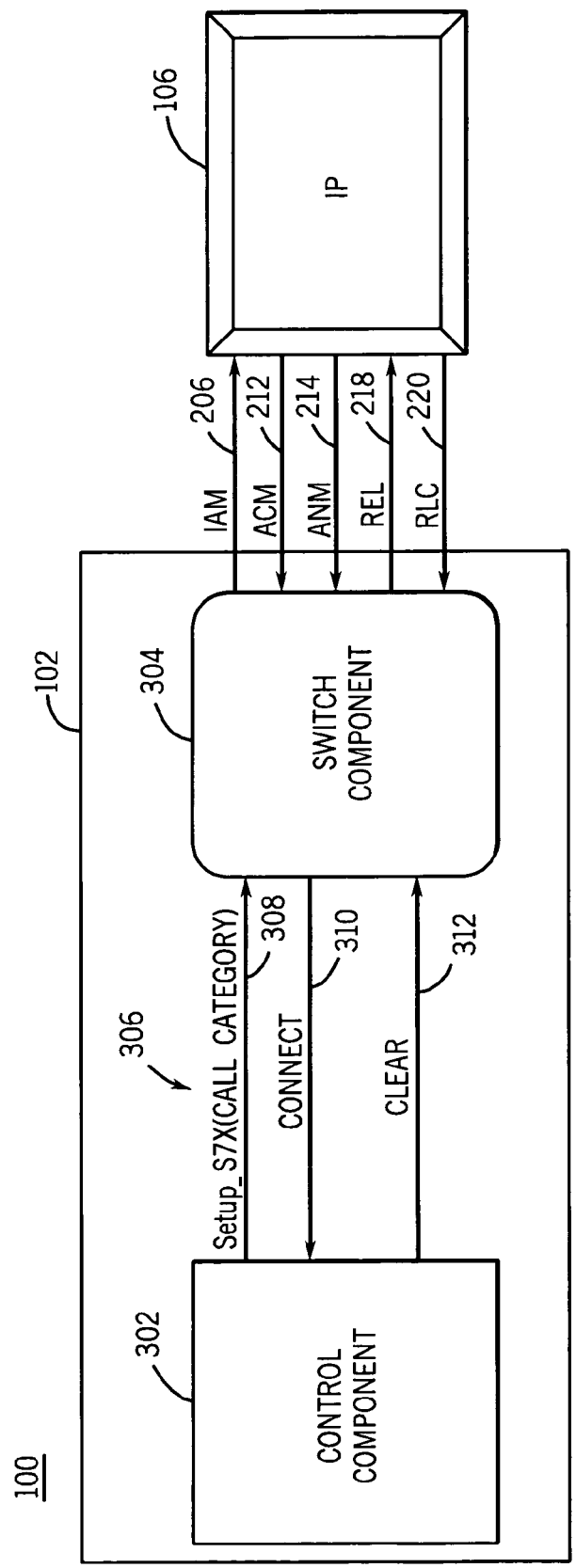
FIG. 3 is a representation of one exemplary message flow for call setup between a control component and a switch component of the call control component of the apparatus of FIG. 1.

Turning to FIG. 3, the O-MSC 102 in one example comprise a control component 302 and a switch component 304. For example, the control component 302 and the switch component 304 comprise subcomponents of the O-MSC 102. A message flow 306 represents an exemplary call setup between the control component 302 and the switch component 304. For example, the message flow 306 illustrates internal messages of the O-MSC 102 for the call setup.

Upon determination that call meets the criteria to provide the announcement or tone to the calling communication device 110, the control component 302 sends a setup message 308 to the switch component 304. "Setup_S7X(call category)" in one example serves to represent the setup message 308. The setup message 308 comprises a call category. The control component 302 may set the call category to indicate one or more characteristics of the call type, calling communication device type, or called communication device type. For example, the call category may indicate that the call terminates at the IP 106 and an answer message from the IP 106 should not be processed. The call category in one example comprises a calling party category parameter set in the setup message 308 to indicate that the call terminates at the IP 106. The switch component 304 associates the call category with the call. In response to the setup message 308, the switch component 304 sends the IAM 206 to the IP 106.

Upon receipt of one or more of the ACM 212 or ANM 214, the switch component 304 sends a connect message 310 to the control component 302. The connect message 310 serves to acknowledge the connection with the IP 106. Upon receipt of the ANM 214, the switch component 304 checks the call category of the call and determines to not send a corresponding answer message to the control component 302 to prevent initiation of billing for the call based on the ANM 214. The control component 302 is responsible for the billing record (e.g., the AMA billing record) for the call. Thus, preventing delivery of an answer message to the control component 302 from the IP 106 prevents initiation of billing for the call.

To initiate call teardown, the control component 302 sends a clear message 312 to the switch component 304. The clear message 312 serves to release trunk resources connected to the IP 106. The control component 302 releases the Integrated Services Digital Network ("ISDN") User Part ("ISUP") trunk connection to the IP 106 server before the calling communication device 110 is redirected to the called communication device 112 to establish voice communication. In response to the clear message 312, the switch component 304 sends the REL message 218 to the IP 106 and then receives the RLC message 220 from the IP 106. Upon receipt of an answer message from the called communication device 112, the switch component 304 sends a corresponding answer message to the control component 302 to initiate billing for the call.

The apparatus 100 in one example employs one or more computer-readable signal-bearing media. One example of a computer-readable signal-bearing medium for the apparatus 100 comprises one or more instances of the recordable data storage medium of the MSCs 102 and 102. For example, the recordable data storage medium comprises one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network.

The steps or operations described herein are just exemplary. It will be apparent to those skilled in the relevant art that similar functionality can be achieved using other protocols, such as Global System for Mobile communications ("GSM")/Customized Applications for Mobile network Enhanced Logic ("CAMEL"), ANSI Capability Set 1 ("CS-1"), International telecommunication union ("ITU-T") CS-1, and session initiation protocol ("SIP"), by variations of the steps and operations without departing from the spirit of the invention. For instance, the steps may be performed in a differing order, with similar operations, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus, comprising:
a call control component that sets a call category for a call to indicate that the call terminates at an announcement server component prior to connection with a called communication device;
wherein upon receipt of an answer message from the announcement server component, the call control component drops the answer message based on the call category; and
wherein the call control component determines to not update a billing record associated with the call based on the answer message from the announcement server component; and
wherein the call terminates at the announcement server component and the called communication device, wherein the call control component accepts an answer message from the called communication device; and
wherein the call control component drops the answer message from the announcement server component to prevent an initiation of billing for the call based on the answer message from the announcement server component; and
wherein the call control component initiates the billing for the call upon receipt of the answer message from the called communication device.

2. An apparatus, comprising:
a call control component that sets a call category for a call to indicate that the call terminates at an announcement server component prior to connection with a called communication device;
wherein upon receipt of an answer message from the announcement server component, the call control component drops the answer message based on the call category; and
wherein the call control component determines to not update a billing record associated with the call based on the answer message from the announcement server component; and
wherein the call control component receives the call and sends a signaling message associated with the call to the announcement server component to involve the announcement server component on the call; and
wherein the announcement server component plays an announcement for a calling communication device of the call and sends the answer message to the call control component, and wherein the call control component determines to not process the answer message from the announcement server component based on the call category.

3. An apparatus, comprising:
a call control component that sets a call category for a call to indicate that the call terminates at an announcement server component prior to connection with a called communication device;
wherein upon receipt of an answer message from the announcement server component, the call control component drops the answer message based on the call category; and
wherein the call control component determines to not update a billing record associated with the call based on the answer message from the announcement server component; and
wherein a calling communication device initiates the call to the called communication device, and wherein the announcement server component comprises a customized ringback tone component; and wherein the call control component determines that the call meets one or more customized ringback tone criteria set by a user of the called communication device and sets the call category to indicate that the call terminates at the customized ringback tone component; and
wherein the customized ringback tone component sends the answer message to the call control component and plays a preselected ringback tone to the calling communication device prior to answer by the called communication device; and
wherein the call control component determines to not process the answer message to prevent billing for the call while the customized ringback tone component plays the preselected ringback tone to the calling communication device.

4. An apparatus, comprising:
a call control component that sets a call category for a call to indicate that the call terminates at an announcement server component prior to connection with a called communication device;
wherein upon receipt of an answer message from the announcement server component, the call control component drops the answer message based on the call category; and
wherein the call control component determines to not update a billing record associated with the call based on the answer message from the announcement server component; and
wherein the billing record comprises an automatic messaging account billing record associated with one or more of the calling communication device and the called communication device.

5. The apparatus of claim 4, wherein the call control component comprises a control subcomponent and a switching subcomponent, and wherein the call category comprises a calling party category; and
wherein the control subcomponent determines that the call terminates at the announcement server component prior to connection with the called communication device; and
wherein the control subcomponent sends a call setup message to the switching subcomponent, and wherein the control subcomponent sets the calling party category in the call setup message to a value that indicates that the call terminates at the announcement server component prior to connection with the called communication device.

6. The apparatus of claim 5, wherein the switching subcomponent employs the calling party category to determine whether to process incoming answer messages from the announcement server component; and
wherein the switching subcomponent checks the calling party category and if the calling party category is set to the value that indicates that the call terminates at the announcement server component, then the switching subcomponent determines to not alert the control subcomponent of the answer message to prevent the control subcomponent from updating a billing record associated with the call based on the answer message from the announcement server component.

7. An apparatus, comprising:
a call control component that sets a call category for a call to indicate that the call terminates at an announcement server component prior to connection with a called communication device;

wherein upon receipt of an answer message from the announcement server component, the call control component drops the answer message based on the call category; and wherein the call control component determines to not update a billing record associated with the call based on the answer message from the announcement server component; and wherein a carrier trunk supports the answer message between the announcement server component and the call control component, and wherein upon receipt of the answer message from the announcement server component, the call control component employs the call category to determine to not initiate billing for the call based on the answer message.

8. A method, comprising the steps of:

setting a call category for a call to indicate that the call terminates at an announcement server component prior to connection with a called communication device; and preventing an initiation of billing for the call upon receipt of an answer message from the announcement server component based on the call category, wherein a call control component determines to not update a billing record associated with the call based on the answer message from the announcement server component; and wherein the step of setting the call category for the call to indicate that the call terminates at the announcement server component prior to connection with the called communication device comprises the steps of:

querying a home location register for an indication of whether the call will employ the announcement server component;

determining from the indication that the call terminates at an announcement server component prior to connection with a called communication device; and setting the call category to a value that indicates the call terminates at the announcement server component.

9. The method of claim 8, wherein the step of preventing the initiation of billing for the call upon receipt of the answer message from the announcement server component based on the call category comprises the steps of:

checking the call category upon receipt of the answer message from the announcement server component; and dropping the answer message if the call category is set to a value that indicates the call terminates at the announcement server component.

10. The method of claim 8, wherein the step of preventing the initiation of billing for the call upon receipt of the answer message from the announcement server component based on the call category comprises the steps of:

dropping the answer message from the announcement server component to prevent an initiation of billing for the call based on the answer message from the announcement server component; and accepting an answer message from the called communication device to initiate the billing for the call upon receipt of the answer message from the called communication device.

11. A method, comprising the steps of:

setting a call category for a call to indicate that the call terminates at an announcement server component prior to connection with a called communication device; and preventing an initiation of billing for the call upon receipt of an answer message from the announcement server component based on the call category;

wherein the call category comprises a calling party category, and wherein the step of setting the call category for the call to indicate that the call terminates at the announcement server component prior to connection with the called communication device comprises the steps of:

determining that the call terminates at the announcement server component prior to connection with the called communication device; and sending a call setup message with the calling party category in the call setup message set to a value that alerts a switch component for the call to drop the answer message from the announcement server component; and wherein the step of preventing the initiation of billing for the call upon receipt of the answer message from the announcement server component based on the call category comprises the step of:

determining to not update a billing record associated with the call for the answer message from the announcement server component based on the calling party category being set to the value.

12. A method, comprising the steps of:

setting a call category for a call to indicate that the call terminates at an announcement server component prior to connection with a called communication device; and preventing an initiation of billing for the call upon receipt of an answer message from the announcement server component based on the call category;

wherein a calling communication device initiates the call to the called communication device, wherein the announcement server component comprises a customized ringback tone component;

wherein the step of setting the call category for the call to indicate that the call terminates at the announcement server component prior to connection with the called communication device comprises the steps of:

determining that the call meets one or more customized ringback tone criteria set by a user of the called communication device; and setting the call category to indicate that the call terminates at the customized ringback tone component;

wherein the customized ringback tone component sends the answer message to the call control component and plays a preselected ringback tone to the calling communication device prior to answer by the called communication device;

wherein the step of preventing the initiation of billing for the call upon receipt of the answer message from the announcement server component based on the call category comprises the step of:

determining to not process the answer message to prevent billing for the call while the customized ringback tone component plays the preselected ringback tone to the calling communication device.

13. An article, comprising:

one or more computer-readable signal-bearing media;

means in the one or more media for setting a call category for a call to indicate that the call terminates at an announcement server component prior to connection with a called communication device; and means in the one or more media for preventing an initiation of billing for the call upon receipt of an answer message from the announcement server component based on the call category;

wherein a call control component determines to not update a billing record associated with the call based on the answer message from the announcement server component; and wherein the means in the one or more media for preventing the initiation of billing for the call upon receipt of the answer message from the announcement server component based on the call category comprises:

means in the one or more media for checking the call category upon receipt of the answer message from the announcement server component; and means in the one or more media for dropping the answer message if the call category is set to a value that indicates the call terminates at the announcement server component.

* * * * *